(12) United States Patent
Ray et al.

(10) Patent No.: US 11,743,381 B2
(45) Date of Patent: Aug. 29, 2023

(54) SYSTEM AND METHOD FOR ADDING CONTENT TO CONTACT CENTER INTERACTIONS

(71) Applicant: Genesys Telecommunications Laboratories, Inc., Daly City, CA (US)

(72) Inventors: Justin Alan Ray, Durham, NC (US); Paul Rouillard, Durham, NC (US); Joshua Rucker, Durham, NC (US); Omar Estrella, Durham, NC (US)

(*) Notice: Subject to any disclaimer, the term of this patent is extended or adjusted under 35 U.S.C. 154(b) by 28 days.

(21) Appl. No.: 16/897,462

(22) Filed: Jun. 10, 2020

(65) Prior Publication Data

US 2020/0389556 A1 Dec. 10, 2020

Related U.S. Application Data

(60) Provisional application No. 62/859,262, filed on Jun. 10, 2019.

(51) Int. Cl.

| G06F 15/16 | (2006.01) |
| G06F 9/54 | (2006.01) |
| H04L 29/06 | (2006.01) |
| H04M 3/51 | (2006.01) |
| G06Q 30/02 | (2023.01) |
| H04M 3/523 | (2006.01) |
| G06F 9/455 | (2018.01) |

(52) U.S. Cl.
CPC ...... *H04M 3/5175* (2013.01); *G06F 9/45529* (2013.01); *G06F 9/541* (2013.01); *G06Q 30/02* (2013.01); *H04M 3/5191* (2013.01); *H04M 3/5236* (2013.01)

(58) Field of Classification Search
CPC .......... H04M 3/5175; H04M 3/5191; H04M 3/5236; H04M 3/42178; H04M 3/5133; H04M 3/5183; H04M 7/0027; H04M 2201/42; G06F 9/45529; G06F 9/451; G06F 9/44521; G06F 9/547; G06Q 30/02
USPC .......................................... 709/203
See application file for complete search history.

(56) References Cited

U.S. PATENT DOCUMENTS

| 2003/0187988 | A1 | 10/2003 | Lee et al. | |
| 2006/0059461 | A1* | 3/2006 | Baker | G06F 8/20 717/113 |
| 2007/0041567 | A1 | 2/2007 | Anisimov | |
| 2012/0215639 | A1* | 8/2012 | Ramer | G06Q 30/0269 705/14.64 |
| 2013/0069960 | A1* | 3/2013 | McCombe | G06T 1/60 345/505 |
| 2014/0052864 | A1* | 2/2014 | Van Der Linden | H04L 47/70 709/226 |

(Continued)

OTHER PUBLICATIONS

PCT Written Opinion and Search Report for co-pending application No. PCT/US2020/036951 dated Sep. 23, 2020.

*Primary Examiner* — Hamza N Algibhah (57) ABSTRACT

A system and method are presented for the addition of content to contact center interactions. An interaction is routed to an agent in the contact center environment. The interaction is routed through one or more providers of embedded client applications. Providers may be a first party, a DSL provider, or a programmatic provider. The provider triggers a user interface which displays one or more specified embedded client applications to the agent and when the agent selects one of the applications, it is asynchronously loaded through an inline frame.

20 Claims, 4 Drawing Sheets

(56) References Cited

U.S. PATENT DOCUMENTS

| | | | |
|---|---|---|---|
| 2014/0067990 A1* | 3/2014 | Abdelhameed | G06F 16/972 709/213 |
| 2016/0034260 A1* | 2/2016 | Ristock | G06F 8/36 717/109 |
| 2016/0266755 A1* | 9/2016 | Casalaina | G06F 3/0484 |
| 2016/0337426 A1* | 11/2016 | Shribman | H04L 65/612 |
| 2017/0048319 A1* | 2/2017 | Straub | G06F 16/9574 |
| 2020/0128271 A1* | 4/2020 | Tanner | H04N 19/31 |
| 2021/0271485 A1* | 9/2021 | Horsnell | G06F 9/467 |

* cited by examiner

SYSTEM AND METHOD FOR ADDING CONTENT TO CONTACT CENTER INTERACTIONS

CROSS REFERENCE TO RELATED APPLICATION

This application claims the benefit of U.S. Provisional Patent Application No. 62/859,262, titled "SYSTEM AND METHOD FOR CONFIGURABLE, DYNAMIC, CONTEXT-SENSITIVE CONTENT FOR CONTACT CENTER INTERACTIONS", filed in the U.S. Patent and Trademark Office on Jun. 10, 2019, the contents of which are incorporated herein.

BACKGROUND

The present invention generally relates to contact center interaction systems and methods, as well as the addition of content to the interactions. More particularly, the present invention pertains to the application of content that is configurable, dynamic, and context-sensitive the interactions.

SUMMARY

A system and method are presented for the addition of content to contact center interactions. An interaction is routed to an agent in the contact center environment. The interaction is routed through one or more providers of embedded client applications. Providers may be a first party, a DSL provider, or a programmatic provider. The provider triggers a user interface which displays one or more specified embedded client applications to the agent and when the agent selects one of the applications, it is asynchronously loaded through an inline frame.

In one embodiment, a method is presented for adding content to interactions received in a contact center environment, the method comprising the steps of: routing the interaction to an agent, wherein the interaction is routed through one or more providers of embedded client applications; triggering, by the one or more providers, a user interface which displays one or more specified embedded client applications to the agent; and asynchronously loading the one or more embedded client applications, wherein a web page address is loaded into an inline frame when the agent selects one of the specified embedded client applications.

The embedded client application allows one or more parties to add dynamic content to an interaction. The one or more parties comprises at least one of: an internal party and a third party.

The provider, the interaction, and the embedded client application comprise a tuple and multiple inline frames of the embedded client application run.

The applications are pooled. The applications are evicted from the pool based on at least one of: a configurable maximum size and an eviction algorithm.

The provider comprises a first party, in-code provider that is written directly in a UI shell and enables notification of interaction changes and monitoring of a state of the UI shell. The provider may also comprise a DSL provider. The DSL provider allows defined Boolean logic to determine if the application should be displayed for a given interaction. The provider may also comprise a programmatic provider. The programmatic provider uses arbitrary, Turing-complete code to determine if an application should be displayed for a given interaction.

In another embodiment, a system is presented for adding content to interactions received in a contact center environment, the system comprising: a processor; and memory in communication with the processor, the memory storing instructions that, when executed by the processor, causes the processor to: route the interaction to an agent, wherein the interaction is routed through one or more providers of embedded client applications; trigger, by the one or more providers, a user interface which displays one or more specified embedded client applications to the agent; and asynchronously load the one or more embedded client applications, wherein a web page address is loaded into an inline frame when the agent selects one of the specified embedded client applications.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A system and method are presented for configurable, dynamic, context-sensitive content for contact center interactions. An embedded client application that is configurable, dynamic, and context-sensitive described herein may also be referred to as an "interapption". Contact Center agents often need multiple sources of data to assist customers. For instance, agents might need to cross-reference a customer's account in a Customer Relationship Management (CRM) system, consult a reference tool to get relevant information, or view an in-house inventory management system. The number and types of data sources vary by domain and by individual customer. Historically, this has been handled by agents needing to operate multiple applications across their computer's desktop to view the information. At worst, the agent must manually open and either copy/paste or search in the other applications to obtain the necessary information. At best, an administrator within the contact center environment can manually build a screen pop (to launch an external application) or script to show the agent relevant data.

Existing options suffer from several pitfalls, including: manual search and/or copy/paste by agents, screen pops, and scripts. Manual agent work is error prone, labor/time intensive, and requires opening multiple applications per interaction or keeping multiple applications always open, which taxes system resources. Screen pops (i.e., dynamically opening new windows) can also be distracting to an agent. New windows may also need to be manually positioned for each interaction by agents for optimal use. In addition, the screen-popped application may not be built with assisting an agent as its core use-case and may contain superfluous information (headers, branding, navigation, etc.). The developer of the screen-popped app may also have no control over the display of the app. Further, the developer of the screen-popped application might not have the context in which the application is being used.

Scripts must be manually built by contact center administrators. These are usually purpose built for specific use cases (such as outbound dialing campaigns or inbound billing questions). Scripts are usually limited in scope and can become brittle to maintain and difficult to extend into other use cases. Scripts cannot be easily built and maintained by external software engineers and Small and Mid-sized Enterprises (SMEs). Scripts must be manually built, updated, and maintained in-house. They cannot use Software-as-a-Service (SaaS)-based delivery principles where the application can be developed, tested, and iterated externally from the contact center offering itself.

The interapptions system allows application developers and administrators (including first, second, and third party) to deliver dynamic, customized, and focused content to contact center agents on an interaction-by-interaction basis. Developers can use both aspects of the interaction as well as external systems and data to determine if the interaction would benefit from their dynamic content. A developer may use information about the interaction (customer information, media type, interaction source), interaction content (messages and information exchanged between the customer and agent), and metadata attached to the interaction (external customer ids, context ids, etc.) to make dynamic decisions about content which might enrich the interaction. Furthermore, a developer can access external, dynamic data sources to see if additional information might be available to assist the agent in helping the customer.

Upon determining the desire for dynamic content, the interapption developer/admin can return one or many views that will be embedded within the agent's User Interface (UI). Additionally, the application developer/admin can dictate certain facets of the view's display such as its layout orientation (horizontal/vertical), desired size, or relative positioning amongst other agent views. Because the views are embedded within the agent's UI and are specific to an interaction, the custom views can be hyper-focused. The views have no need for application headers, search boxes, navigation, etc. Rather, the views provide focused, detailed, contextually-relevant information embedded right inside the agent's UI. Finally, the views can utilize a command and control Software Development Kit (SDK) to request programmatic actions in the host application such as requesting attention, popping toast messages, automatically replying to customers, and much more.

There are several benefits to the embodiments described herein. First, limitless, context-sensitive content can be dynamically delivered. With dynamic, context-sensitive add-ons, interapption providers allow a mechanism to enrich the interaction UI for agents. Dynamic, limitless views can be easily added to interactions informed by internal and external data. The added views are appropriate for the specific interaction and are focused to help the agent help the end-customer. A plurality of providers are enabled, including, to name a few non-limiting examples, domain specific language providers and programmatic providers. Domain specific language providers may be best for basic apps and administrator-level configuration of interapptions. Programmatic providers provide a Turing-complete way to dynamically query the interaction and any other data sources to determine if the interaction would benefit from interapptions. These providers allow for application developers and third-party authorized vendors to build engaging add-ons and allow for full access to conversation, APIs, etc. New, unforeseen verticals enable third-party developers to build providers. Applications unlock limitless verticals that do not require product development or engineering efforts to realize from the contact center environment developers. Multiple use cases per interaction allow multiple interapption providers to be configured per organization/user to allow for multiple types of applications to be provided for each interaction. An interapption provider can provide one or more interapption(s) per interaction, or, if none are determined to be relevant, none may be provided.

Secondly, unprecedented add-on user experience is provided. Interapption vendors may be given controls to build compelling add-on suites for every interaction. They can choose to return multiple interapptions in varying layouts and sizes. They can build entire features atop the platform. Programmatic Command and Control Access (via SDKs) is also allowed. For example, application developers have access to a Command and Control API to deepen the integration with the host application. Developers can pop toasts, request focus, track focus, auto-fill communications on behalf of the agent, and much more.

Thirdly, brand-new content delivery mechanisms are enabled. These may be first, second, and third party. The interruptions and the interapption providers are capable of being built by many stakeholders (e.g. internally by contact center staff, contact center platform provider developers and/or their professional services organizations, third-party vendors, etc.). The delivery mechanisms can be built and maintained by vendors, developers, partners, and SMEs. The interruptions and the interapption providers can be constructed by experts in the field versus by staff at a single contact center. The delivery mechanisms can also be externally hosted and dynamically updated (SaaS). Because interapptions are externally hosted code, both the provider and apps themselves can be dynamically built, tested, deployed, and rolled back. The apps can be managed externally from the contact center platform.

Contact Center Systems

Figure 1:
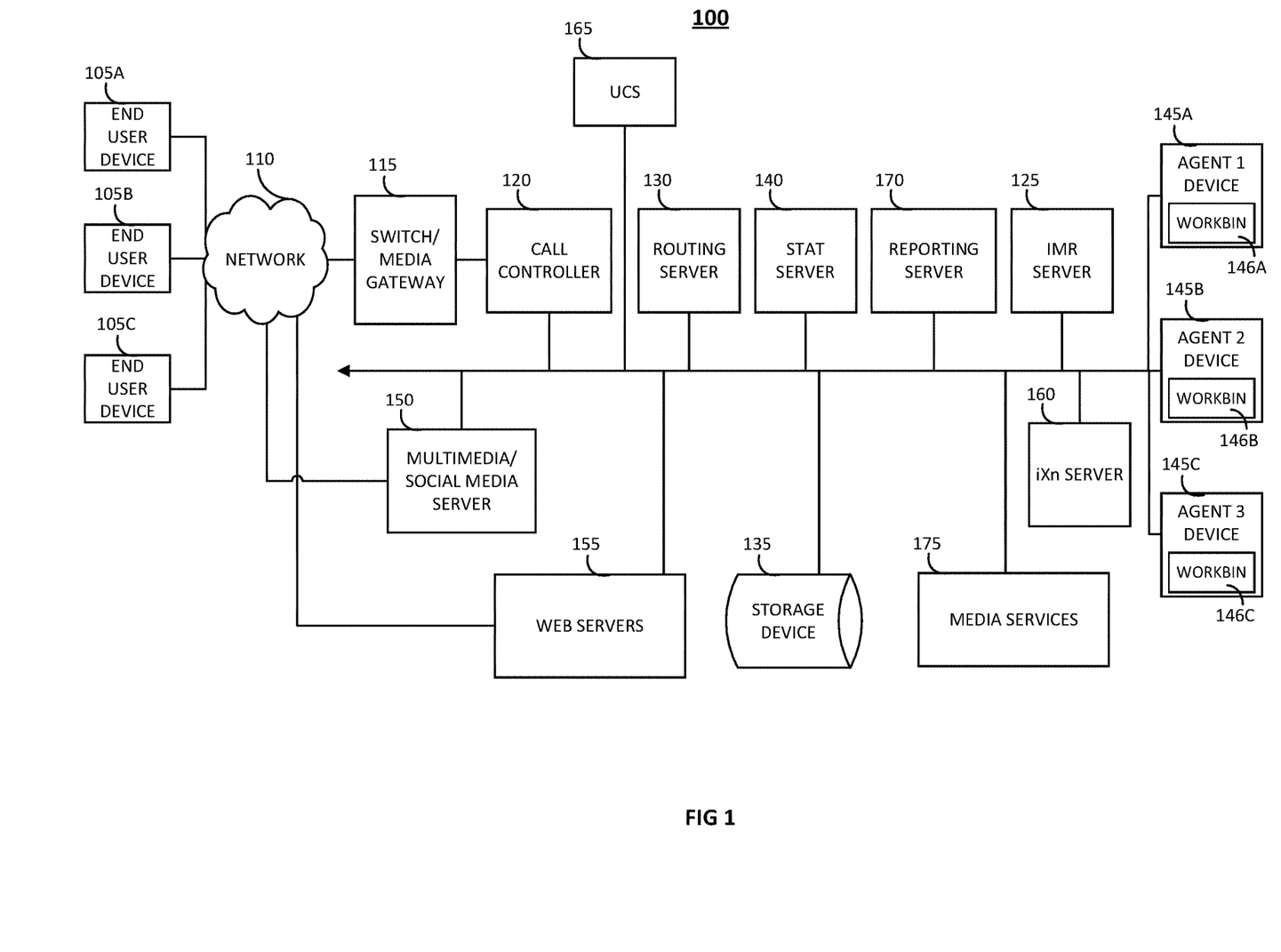
FIG. 1 is a diagram illustrating an embodiment of a communication infrastructure.

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C comprising workbins 146A, 146B, 146C; a multimedia/social media server 150; web servers 155; an iXn server 160; a UCS 165; a reporting server 170; and media services 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication and additionally to the contact center admin/supervisor device for managing the contact center. In this regard, each device 145 may include a telephone adapted for regular telephone calls, VoIP calls, etc. The device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc. Widgets may be deployed on the websites hosted on the web servers 155.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a CRM database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In an embodiment, the premises-based platform product may provide access to and control of components of the system 100 through UIs present on the agent devices 145A-C. Within the premises-based platform product, the graphical application generator program may be integrated which allows a user to write the programs (handlers) that control various interaction processing behaviors within the premises-based platform product.

As noted above, the contact center may operate as a hybrid system in which some or all components are hosted remotely, such as in a cloud-based environment. For the sake of convenience, aspects of embodiments of the present invention will be described below with respect to providing SaaS from a cloud-based environment to components housed on-premises.

Figure 2:
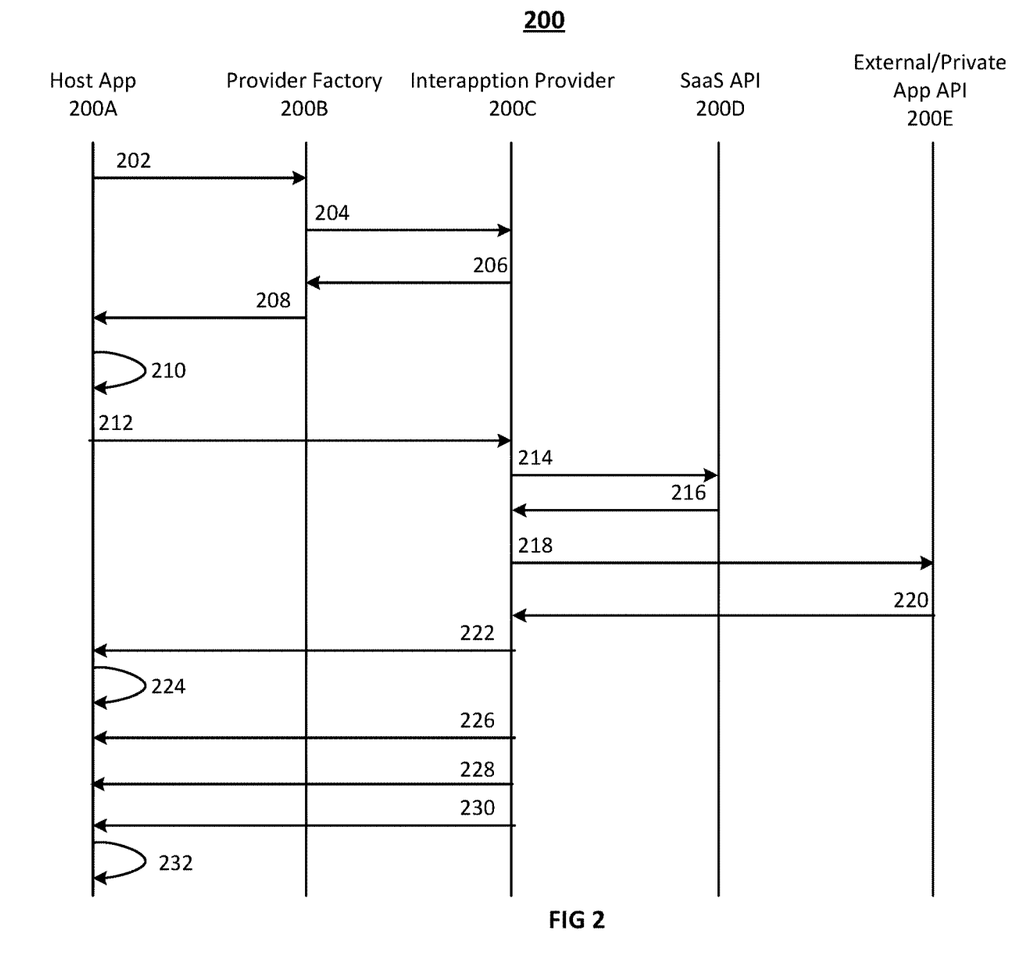
FIG. 2 is a flow diagram illustrating an embodiment of a process.

FIG. 2 is a flow diagram illustrating an embodiment of a process for configuring providers, displaying interraptions associated with an interaction when the interaction is routed to an agent, and optionally handling state changes, indicated generally at 200. The interapptions platform is comprised of several components including providers, application configurations, and displays. As illustrated in 200, a Host App 200A, a Provider Factory 200B, a Dynamic Interapption Provider 200C, a SaaS Public API 200D, and an External/Private App API 200E are shown. Initially, if it is desired to create a new provider in the system by a developer or administrator, the Host App 200A sends a request 'getProvidersForUser(userContext)' to the Provider Factory 200B for providers 202. The Host App 200A comprises the SaaS platform that may be running in the contact center environment. The Provider Factory 200B comprises a plurality of interapptions providers that may be configured or installed by an administrator, or built-in to the host application 200A. The providers that are configured or installed by an administrator may be stored with the Dynamic Interapption Provider 200C. Interapption providers comprise bits of software that utilize the details of a specified interaction as well as external factors and data sources to determine if this provider would like to decorate the specified interaction with dynamic content in the form of interapptions. Interapption providers can be configured and also dynamically/programmatically enabled; therefore, there can be any number of interapption providers for different organizations, departments, or users. Factors such as user access control, licensing, etc. might also modify the list of interapption providers available to a given user. The Provider Factory 200B sends a request to create 204 to the Dynamic Interapption Provider 200C. The Dynamic Interapption Provider 200C returns an acknowledgement 206 to the Provider Factory 200B, which then sends an array of providers 208 to the Host App 200A. The listing of third party interapptions providers is updated and run in a separate execution context 210.

When an interaction is received in the contact center environment, third-party providers are invoked via messaging rather than direct method call 212. Each conversation that is routed to an agent is passed to one or more interapption providers. In an embodiment, DSL providers are not passed any arguments as their DSL grammar is interpreted for them. The Host App 200A requests app configurations (e.g., interactionID, callback) from the Dynamic Interapption Provider 200C. Depending on the type of provider, providers can be sent the entire interaction object, the interaction ID, or no interaction data. Dynamic providers will also be sent a callback allowing the provider to dynamically change the interapptions list at any point. The Dynamic Interapption Provider 200C requests conversation details using the interactionID from the SaaS Public API 200D 214. The SaaS Public API returns the conversation Details 216 to the Dynamic Interrapption Provider 200C, which then request the Customer record 218 from the External Private App API 200E. The External Private App API returns the external Customer Record as an object 220 to the Dynamic Interrapption Provider 200C. The Dynamic Interruption provider 200C returns the interruptions configurations 222 to the Host App 200A. In an embodiment, no apps may be returned if none match. In another embodiment, there may be one or more that are applicable for the passed interaction.

Interapption Providers 200C should return a list of interapption configuration objects that will inform the HostApp 200A how to render the desired interapptions 222. Among other data, these configuration objects will contain: ID, Name, Icons; URL of application to load; Security Settings (iframe sandbox); Layout and Size preferences (e.g. Horizontal vs Vertical. 50% vs 75%); and Application Type for specialized host app treatment (grouping, order, etc.).

There are several types of interapption providers, including: built-in, DSL, and Programmatic, to name some non-limiting examples. Built-in interapption providers are reserved for first class code, or code created by the developer of the SaaS platform used in the contact center environment. They are provided the full interaction object and can access any resource inside the SaaS platform. These types of providers are not available for third parties. DSL interapption providers utilize a DSL grammar (or Boolean logic) that can be used to check interaction details to make a determination if an interapption should be shown for a given interaction. Because the DSL does not allow arbitrary code execution, this interpretation can occur within the HostApp sandbox. Also, no data needs to be transferred to the interapption provider developer at this stage for evaluation.

The interapption provider DSL can be specified at install time by a contact center administrator or can be pre-configured by an application vendor for a managed solution.

The final and most advanced type of interapption provider is the programmatic provider. This provider can run arbitrary, Turing-complete code in an isolated sandbox to make decisions on interapptions. This type of interapption provider can also make calls to arbitrary data sources available on the internet to gather more data. Finally, this provider can manually update the list of available interapptions for an interaction at any time. This type of provider is written directly in the UI shell (or web-directory). It allows the app developer to be notified of changes to interactions, monitor other details of web-directory state, such as feature toggles, permissions, etc., and allows access to the out-of-band app update callback.

The programmatic interapption provider is best suited for professional developers who want to build a high-quality, dynamic integration suite for use in a specific contact center. Upon receiving interapption configurations from the various interapption providers, the HostApp 200A can display the various views to the agent 224 via a UI in a tab or other layout. The HostApp 200A will make the correct interapptions available for the active interaction selected by the agent and in the locations specified by the interapption configuration. The interapptions are lazily (or asynchronously) loaded. When the user clicks the app tab, web-directory will load the specified URL in an iframe for the user.

In an embodiment, client application SDKs can be invoked to interact with the application's lifecycle (bootstrap, blur, focus, stop). The views in the Host App 200A can also utilize a command and control UI commands to request programmatic actions 226 in the host application such as requesting attention, popping toast messages, automatically replying to customers, and much more. The programmatic actions are returned 228 from the Dynamic Interapptions Provider 200C.

In an embodiment, if there is an interaction or external state change, the Dynamic Interapption Providers 200C can update the list of apps at any time in the Host App 200A using a callback 230. The Host App 200A display of interruptions can be refreshed using the LRU algorithm 232. In web-based products, the views themselves are created as inline frames (or 'iframes') to allow for code execution isolation for third-party applications. Views are cached across interactions to allow for rapid restoration of interapption state. Interapptions may be evicted based on a configurable maximum size and an eviction algorithm (e.g., Least Recently Used (LRU) algorithm), such as, for example, when the maximum number of concurrent interapptions is reached. Apps are pooled to allow iframes to stay in DocumentObject Model (DOM) for state maintenance and also to limit total resources utilized by the DOM. Interapptions are pooled across all active interactions and providers and capped by web-directory. Applications may be evicted from the pool based on an LRU algorithm when the maximum number (or other threshold) of concurrent interapptions is reached. As a result, the application may be torn down at any point, except when a user is directly interacting with the ap. The application is lightweight to load/reload and reduces the amount of state it maintains.

In an embodiment, the provider, interaction, and interapption function as a tuple. Multiple instances (iframes) of the application can be running within web-directory. The app developer is freed from needing to manage current interaction state.

In an embodiment, in addition to when the interaction is initially routed to the agent, changes to the conversation may also trigger the provider flow (regardless of the type of provider). Providers can respond to changes to the conversation (the state) as well as any attached context which may provided (such as through web-chat or association with external contacts).

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 3A, 3B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a SaaS to provide functionality over the internet using various protocols, such as by exchanging data using encoded in extensible markup language (XML) or JSON.

Figure 3A:
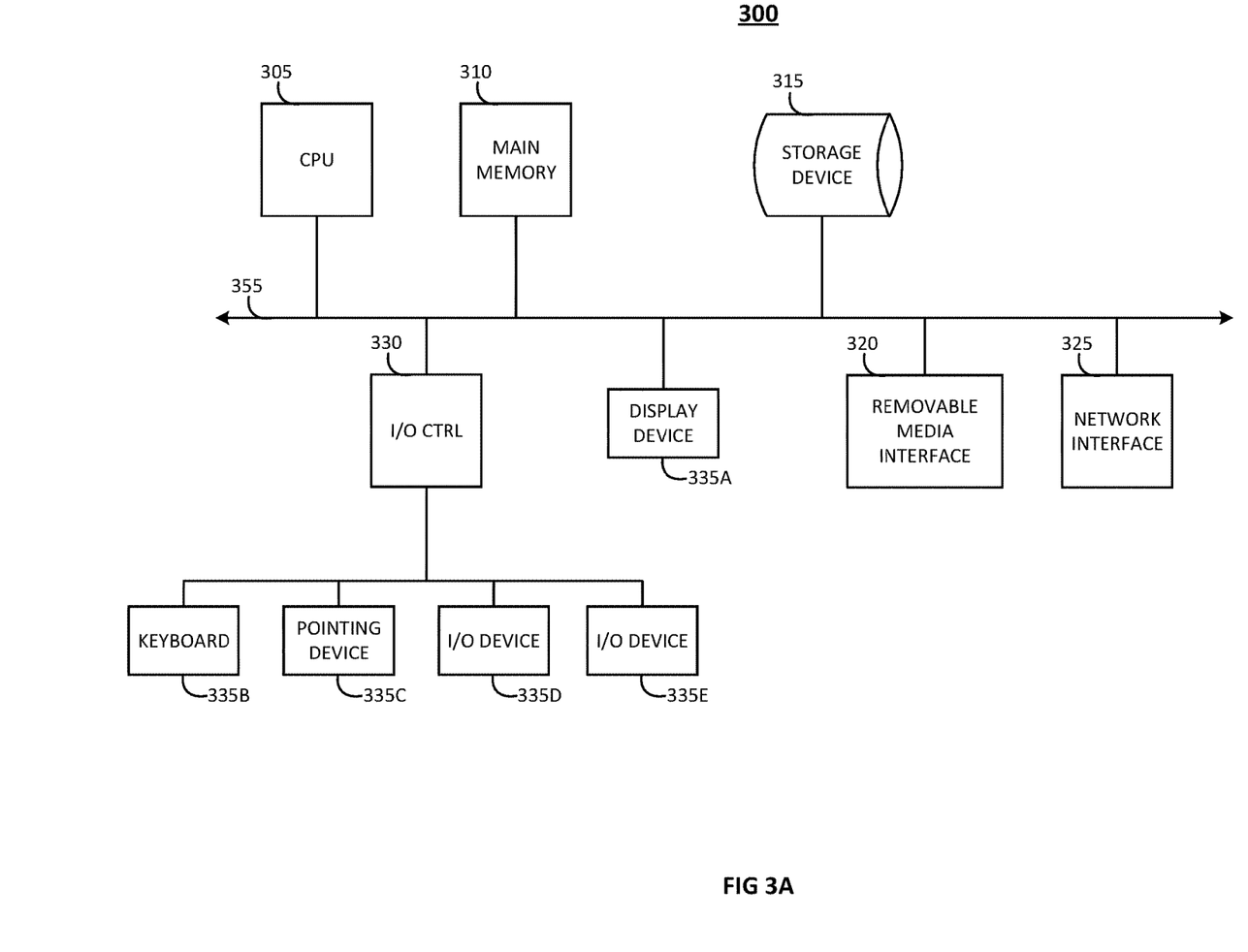
FIG. 3A is a diagram illustrating an embodiment of a computing device.
Figure 3B:
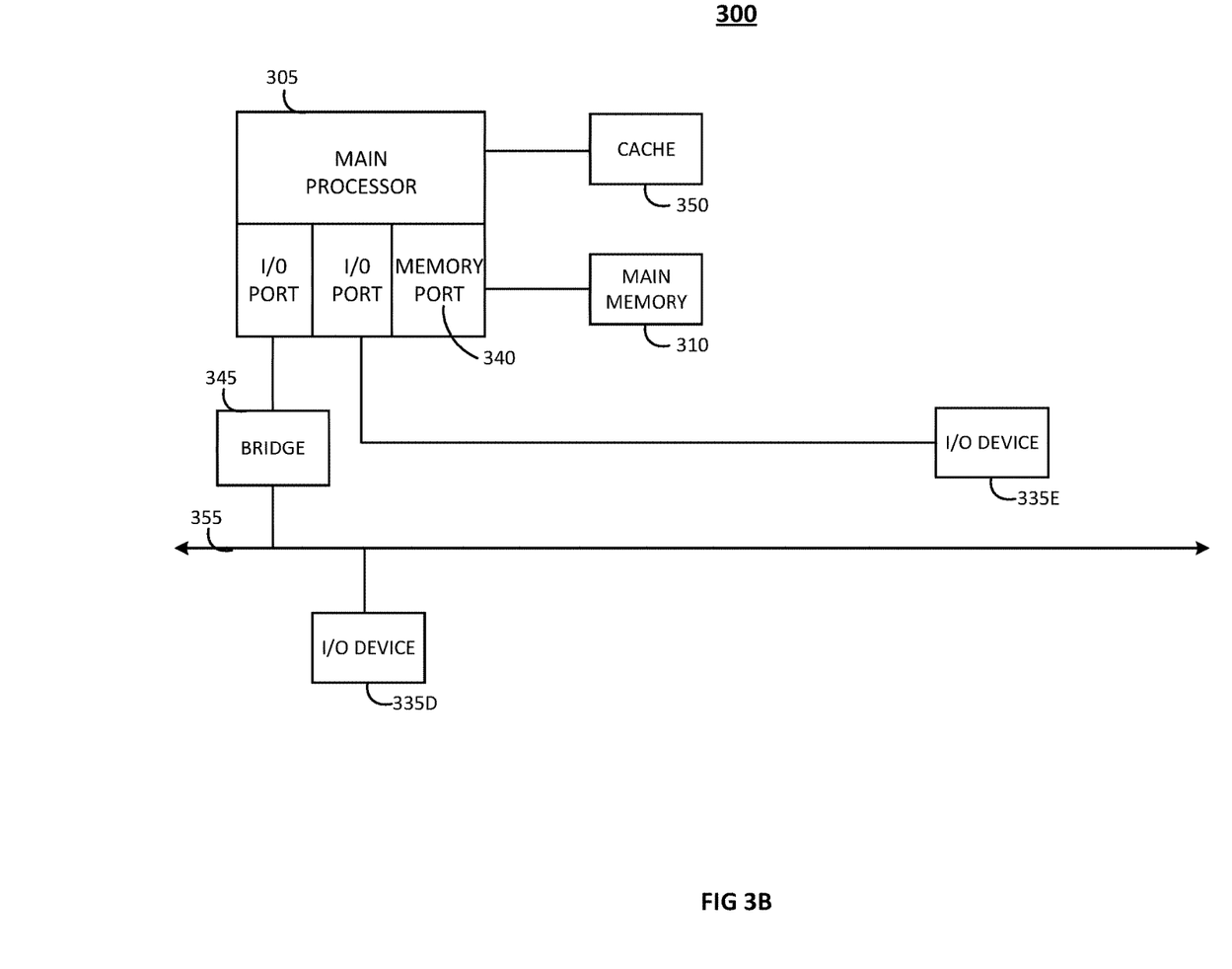
FIG. 3B is a diagram illustrating an embodiment of a computing device.

FIGS. 3A and 3B are diagrams illustrating an embodiment of a computing device as may be employed in an embodiment of the invention, indicated generally at 300. Each computing device 300 includes a CPU 305 and a main memory unit 310. As illustrated in FIG. 3A, the computing device 300 may also include a storage device 315, a removable media interface 320, a network interface 325, an input/output (I/O) controller 330, one or more display devices 335A, a keyboard 335B and a pointing device 335C (e.g., a mouse). The storage device 315 may include, without limitation, storage for an operating system and software. As shown in FIG. 3B, each computing device 300 may also include additional optional elements, such as a memory port 340, a bridge 345, one or more additional input/output devices 335D, 335E, and a cache memory 350 in communication with the CPU 305. The input/output devices 335A, 335B, 335C, 335D, and 335E may collectively be referred to herein as 335.

The CPU 305 is any logic circuitry that responds to and processes instructions fetched from the main memory unit 310. It may be implemented, for example, in an integrated circuit, in the form of a microprocessor, microcontroller, or graphics processing unit, or in a field-programmable gate array (FPGA) or application-specific integrated circuit (ASIC). The main memory unit 310 may be one or more memory chips capable of storing data and allowing any storage location to be directly accessed by the central processing unit 305. As shown in FIG. 3A, the central processing unit 305 communicates with the main memory 310 via a system bus 355. As shown in FIG. 3B, the central processing unit 305 may also communicate directly with the main memory 310 via a memory port 340.

In an embodiment, the CPU 305 may include a plurality of processors and may provide functionality for simultaneous execution of instructions or for simultaneous execution of one instruction on more than one piece of data. In an embodiment, the computing device 300 may include a parallel processor with one or more cores. In an embodiment, the computing device 300 comprises a shared memory parallel device, with multiple processors and/or multiple processor cores, accessing all available memory as a single global address space. In another embodiment, the computing device 300 is a distributed memory parallel device with multiple processors each accessing local memory only. The computing device 300 may have both some memory which is shared and some which may only be accessed by particular processors or subsets of processors. The CPU 305 may include a multicore microprocessor, which combines two or more independent processors into a single package, e.g., into a single integrated circuit (IC). For example, the computing device 300 may include at least one CPU 305 and at least one graphics processing unit.

In an embodiment, a CPU 305 provides single instruction multiple data (SIMD) functionality, e.g., execution of a single instruction simultaneously on multiple pieces of data. In another embodiment, several processors in the CPU 305 may provide functionality for execution of multiple instructions simultaneously on multiple pieces of data (MIMD). The CPU 305 may also use any combination of SIMD and MIMD cores in a single device.

FIG. 3B depicts an embodiment in which the CPU 305 communicates directly with cache memory 350 via a secondary bus, sometimes referred to as a backside bus. In other embodiments, the CPU 305 communicates with the cache memory 350 using the system bus 355. The cache memory 350 typically has a faster response time than main memory 310. As illustrated in FIG. 3A, the CPU 305 communicates with various I/O devices 335 via the local system bus 355. Various buses may be used as the local system bus 355, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 335A, the CPU 305 may communicate with the display device 335A through an Advanced Graphics Port (AGP). FIG. 3B depicts an embodiment of a computer 300 in which the CPU 305 communicates directly with I/O device 335E. FIG. 3B also depicts an embodiment in which local buses and direct communication are mixed: the CPU 305 communicates with I/O device 335D using a local system bus 355 while communicating with I/O device 335E directly.

A wide variety of I/O devices 335 may be present in the computing device 300. Input devices include one or more keyboards 335B, mice, trackpads, trackballs, microphones, and drawing tables, to name a few non-limiting examples. Output devices include video display devices 335A, speakers and printers. An I/O controller 330 as shown in FIG. 3A, may control the one or more I/O devices, such as a keyboard 335B and a pointing device 335C (e.g., a mouse or optical pen), for example.

Referring again to FIG. 3A, the computing device 300 may support one or more removable media interfaces 320, such as a floppy disk drive, a CD-ROM drive, a DVD-ROM drive, tape drives of various formats, a USB port, a Secure Digital or COMPACT FLASH' memory card port, or any other device suitable for reading data from read-only media, or for reading data from, or writing data to, read-write media. An I/O device 335 may be a bridge between the system bus 355 and a removable media interface 320.

The removable media interface 320 may, for example, be used for installing software and programs. The computing device 300 may further include a storage device 315, such as one or more hard disk drives or hard disk drive arrays, for storing an operating system and other related software, and for storing application software programs. Optionally, a removable media interface 320 may also be used as the storage device. For example, the operating system and the software may be run from a bootable medium, for example, a bootable CD.

In an embodiment, the computing device 300 may include or be connected to multiple display devices 335A, which each may be of the same or different type and/or form. As such, any of the I/O devices 335 and/or the I/O controller 330 may include any type and/or form of suitable hardware, software, or combination of hardware and software to support, enable or provide for the connection to, and use of, multiple display devices 335A by the computing device 300. For example, the computing device 300 may include any type and/or form of video adapter, video card, driver, and/or library to interface, communicate, connect or otherwise use the display devices 335A. In an embodiment, a video adapter may include multiple connectors to interface to multiple display devices 335A. In another embodiment, the computing device 300 may include multiple video adapters, with each video adapter connected to one or more of the display devices 335A. In other embodiments, one or more of the display devices 335A may be provided by one or more other computing devices, connected, for example, to the computing device 300 via a network. These embodiments may include any type of software designed and constructed to use the display device of another computing device as a second display device 335A for the computing device 300. One of ordinary skill in the art will recognize and appreciate the various ways and embodiments that a computing device 300 may be configured to have multiple display devices 335A.

An embodiment of a computing device indicated generally in FIGS. 3A and 3B may operate under the control of an operating system, which controls scheduling of tasks and access to system resources. The computing device 300 may be running any operating system, any embedded operating system, any real-time operating system, any open source operation system, any proprietary operating system, any operating systems for mobile computing devices, or any other operating system capable of running on the computing device and performing the operations described herein.

The computing device 300 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 300 may have different processors, operating systems, and input devices consistent with the device.

In other embodiments, the computing device 300 is a mobile device. Examples might include a Java-enabled cellular telephone or personal digital assistant (PDA), a smart phone, a digital audio player, or a portable media player. In an embodiment, the computing device 300 includes a combination of devices, such as a mobile phone combined with a digital audio player or portable media player.

A computing device 300 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 300 communicates with other computing devices 300 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

In an embodiment, the use of LSH to automatically discover carrier audio messages in a large set of pre-connected audio recordings may be applied in the support process of media services for a contact center environment. For example, this can assist with the call analysis process for a contact center and removes the need to have humans listen to a large set of audio recordings to discover new carrier audio messages.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for dynamically changing content applied to interactions received in a contact center environment and presented for view in a user interface, the method comprising the steps of:
   routing the interaction to an agent computing device, wherein the interaction is routed through one or more providers of embedded client applications;
   triggering, by the one or more providers, a user interface which displays one or more specified embedded client applications to the agent, permitting the selection of an embedded client application using the agent computing device, wherein said triggering comprises said one or more providers sending a configuration object for each of the specified embedded client applications which informs the agent computing device how to render the selected embedded client application, and wherein the one or more specified embedded client applications include contextually relevant information embedded inside the user interface, wherein the contextually relevant information includes information about the interaction, interaction content, and metadata attached to the interaction to permit dynamic decisions for enriching the interaction;
   responsive to the selection by the agent of one or more of the embedded client applications, asynchronously loading the one or more selected embedded client applications as a web page address loaded into an inline frame in accordance with the associated configuration object, wherein views are cached across interactions for rapid state restoration, and
   evicting applications from the user interface based on a configurable maximum size and an algorithm when the maximum number of concurrent applications is reached.

2. The method of claim 1, wherein the embedded client application allows one or more parties to add dynamic content to an interaction.

3. The method of claim 2, wherein the one or more parties comprises at least one of: an internal party and a third party.

4. The method of claim 1, wherein the provider, the interaction, and the embedded client application comprise a tuple and multiple inline frames of the embedded client application run.

5. The method of claim 1, wherein the applications are pooled.

6. The method of claim 1, wherein the provider comprises a first party, in-code provider that is written directly in a UI shell and enables notification of interaction changes and monitoring of a state of the UI shell.

7. The method of claim 1, wherein the provider comprises a DSL provider.

8. The method of claim 7, wherein the provider allows defined Boolean logic to determine if the application should be displayed for a given interaction.

9. The method of claim 1, wherein the provider comprises a programmatic provider.

10. The method of claim 9, wherein the provider uses arbitrary, Turing-complete code to determine if an application should be displayed for a given interaction.

11. A system is presented for dynamically changing content applied to interactions received in a contact center environment and presented for view in a user interface, the system comprising:
    a processor; and
    memory in communication with the processor, the memory storing instructions that, when executed by the processor, causes the processor to:
      route the interaction to an agent computing device, wherein the interaction is routed through one or more providers of embedded client applications, wherein the one or more specified embedded client applications include contextually relevant information embedded inside the user interface, wherein the contextually relevant information includes information about the interaction, interaction content, and metadata attached to the interaction to permit dynamic decisions for enriching the interaction;
      trigger, by the one or more providers, a user interface which displays one or more specified embedded client applications to the agent, permitting the selection of an embedded client application using the agent computing device, wherein said triggering comprises said one or more providers sending a configuration object for each of the specified embedded client applications which informs the agent computing device how to render the selected embedded client application;
      responsive to the selection by the agent of one or more of the embedded client applications, asynchronously load the one or more selected embedded client applications, as a web page address loaded into an inline frame in accordance with the associated configuration object, wherein views are cached across interactions for rapid state restoration, and evicting applications from the user interface based on a configurable maximum size and an algorithm when the maximum number of concurrent applications is reached.

12. The system of claim 11, wherein the embedded client application allows one or more parties to add dynamic content to an interaction.

13. The system of claim 12, wherein the one or more parties comprises at least one of: an internal party and a third party.

14. The system of claim 11, wherein the provider, the interaction, and the embedded client application comprise a tuple and multiple inline frames of the embedded client application run.

15. The system of claim 12, wherein the applications are pooled.

16. The system of claim 11, wherein the provider comprises a first party, in-code provider that is written directly in a UI shell and enables notification of interaction changes and monitoring of a state of the UI shell.

17. The system of claim 11, wherein the provider comprises a DSL provider.

18. The system of claim 17, wherein the provider allows defined Boolean logic to determine if the application should be displayed for a given interaction.

19. The system of claim 11, wherein the provider comprises a programmatic provider.

20. The system of claim 19, wherein the provider uses arbitrary, Turing-complete code to determine if an application should be displayed for a given interaction.

* * * * *